US010698570B2

(12) United States Patent
Ravindran et al.

(10) Patent No.: US 10,698,570 B2
(45) Date of Patent: Jun. 30, 2020

(54) USER-CENTRIC, CONTEXT AWARE USER INTERFACE

(71) Applicants: Sourabh Ravindran, Dallas, TX (US); Youngjun Yoo, Plano, TX (US); Michael Oliver Polley, Garland, TX (US)

(72) Inventors: Sourabh Ravindran, Dallas, TX (US); Youngjun Yoo, Plano, TX (US); Michael Oliver Polley, Garland, TX (US)

(73) Assignee: Samsung Electronics Co., Ltd., Suwan-si (KR)

( * ) Notice: Subject to any disclaimer, the term of this patent is extended or adjusted under 35 U.S.C. 154(b) by 77 days.

(21) Appl. No.: 15/350,679

(22) Filed: Nov. 14, 2016

(65) Prior Publication Data

US 2018/0136796 A1 May 17, 2018

(51) Int. Cl.

| | |
|---|---|
| ***G06F 3/14*** | (2006.01) |
| ***G06F 3/0482*** | (2013.01) |
| ***G06Q 30/02*** | (2012.01) |
| ***H04M 1/725*** | (2006.01) |
| ***G06F 16/00*** | (2019.01) |
| ***G06F 3/0484*** | (2013.01) |

(52) U.S. Cl.

CPC .......... *G06F 3/0482* (2013.01); *G06F 3/0484* (2013.01); *G06F 16/00* (2019.01); *G06Q 30/0201* (2013.01); *H04M 1/72563* (2013.01); *H04M 1/72569* (2013.01); *H04M 1/72572* (2013.01)

(58) Field of Classification Search

CPC .................................... G06F 3/14; G06F 3/17

USPC ................ 715/745, 810; 345/502; 455/414.1

See application file for complete search history.

(56) References Cited

U.S. PATENT DOCUMENTS

| | | | |
|---|---|---|---|
| 8,473,949 B2 | 6/2013 | Horvitz et al. | |
| 8,688,726 B2 | 4/2014 | Mahajan et al. | |
| 8,745,505 B2 | 6/2014 | Tam | |
| 9,064,011 B2 | 6/2015 | Maharajb | |
| 9,292,603 B2 | 3/2016 | Matthieu | |
| 9,313,265 B2 | 4/2016 | Peterson | |
| 9,317,867 B2 | 4/2016 | Johnson | |
| 9,319,451 B2 | 4/2016 | Sarat et al. | |
| 9,332,004 B2 | 5/2016 | Padmanand | |
| 2006/0161863 A1 * | 7/2006 | Gallo | G06F 9/542 715/810 |
| 2007/0101291 A1 | 5/2007 | Forstall et al. | |
| 2008/0162387 A1 | 7/2008 | Singh et al. | |

(Continued)

FOREIGN PATENT DOCUMENTS

KR 20120050255 5/2012

OTHER PUBLICATIONS

Dragon Go! Say It . Get it. And Go! Published May 11, 2016.

Supplemental European Search Report, EP Appl. 17869744.7, dated Sep. 9, 2019.

*Primary Examiner* — Ruay Ho

(74) *Attorney, Agent, or Firm* — John J. King

(57) ABSTRACT

A method of implementing a user interface on a mobile device is described. The method comprises learning user preference and context information; storing user preferences associated with the user-centric interface on at least one of the device or a secure server; determining and updating the context information and the user preferences on at least one of the device or a secure server.

27 Claims, 14 Drawing Sheets

516 502 408 504 510 604 602 606 608 512 514 400

COUPON

MENU Mexican

CALL

Order Online

Website

Top Tacos

(56) References Cited

U.S. PATENT DOCUMENTS

| | | | | |
|---|---|---|---|---|
| 2009/0223433 | A1 | 1/2009 | Walley et al. | |
| 2010/0313141 | A1 | 12/2010 | Yu et al. | |
| 2013/0018915 | A1 | 1/2013 | Kalu kalu | |
| 2013/0095801 | A1 * | 4/2013 | Kermoian ......... | H04M 1/72597 455/414.1 |
| 2014/0019637 | A1 | 1/2014 | Yang et al. | |
| 2014/0129599 | A1 | 5/2014 | Boccon-Gibod | |
| 2015/0227523 | A1 | 8/2015 | LaBeau et al. | |
| 2016/0070806 | A1 | 3/2016 | Kergin | |
| 2016/0269540 | A1 | 9/2016 | Butcher et al. | |

* cited by examiner

USER-CENTRIC, CONTEXT AWARE USER INTERFACE

FIELD OF THE INVENTION

An embodiment of the present invention relates generally to mobile electronic devices, and in particular, to a user-centric, context aware user interface for a mobile electronic device.

BACKGROUND OF THE INVENTION

Applications, or commonly called "apps," that are developed to run on mobile devices have become very important to users of the mobile devices. Most apps function from the perspective of a business or commercial entity and not the user. Different apps have different perspectives based on their functionality. However, there is no single app that provides information to a user that completely represents the user's interests.

Further, every app on a mobile device has a "perspective" of the user and the user's needs. These perspectives are almost always different based on the functionality of the app. For example, user searches on same item on a Google Maps and Google search bar produce results that are different. There is no one solution representing a unified view of the user.

Current apps are business-centric and current "user preference learning" is for the benefit of the app or the business. For example, an app for a retailer might be interested in knowing what items the user recently searched for so they can advertise merchandize to the user.

Further, "user preference learning" or customization also suffers from privacy concerns. Most of the learning is cloud based, and users are wary of data uploaded to the cloud. The "user preference learning" leading to ads being served to the users can feel like the invasion of a user's privacy.

Current "context detection" functions are limited to location (e.g. geo-fencing) based information pushing (i.e. based on your proximity to a store, a user might be notified of certain promotional items). Therefore, the functionality of context detection is every limited.

What is desired is a user interface that is user-centric and that is context aware to continuously make meaningful information available to a user in response to a search or in real time based upon a context of the device or actions of the user.

SUMMARY OF THE INVENTION

A method of implementing a user interface on a mobile device is described. The method comprises learning user preference and context information; storing user preferences associated with the user-centric interface on at least one of the device or a secure server; determining and updating the context information and the user preferences on at least one of the device or a secure server.

Another method of implementing a user interface on a mobile device comprises storing user preferences related to a user interface; displaying task buttons on a display of the mobile device in response to a user accessing the user interface; displaying task options in response to selecting a particular one of the task buttons; and updating context and the user preferences for the user interface based upon the selection of the particular one of the task buttons.

A further method of implementing a user interface on a mobile device comprises displaying task buttons related to a user interface; monitoring the selection of a particular one of the task buttons of the user interface; and displaying relevant information in response to a selection of the particular one of the task buttons.

A user interface displayed on a display device that enables a user to perform a search on a mobile device, the user interface comprising: the display device configured to display: a search input element; and task buttons generated in response to a search that are user centric; wherein the task buttons are presented and their functionality is adapted based on the search and actions of the user.

A non-transitory computer-readable medium that includes a program that when executed by a computer performs a method comprising: learning user preferences and context information; storing user preferences associated with the user-centric interface on at least one of a device or a secure server; determining and updating the context information and user preferences on at least one of the device or the secure server.

Other features will be recognized from consideration of the Detailed Description and the Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The systems and methods set forth below provide a user interface (UI) for a mobile device that addresses the deficiencies of the current business-centric nature of the app experience. The user interfaces set forth below are user-centric and provide a unified view from the user's perspective. The user interface is context dependent and adaptive to user actions, and is customized to the user. For example, the user interface learns user preferences without compromising user privacy.

Figure 1:
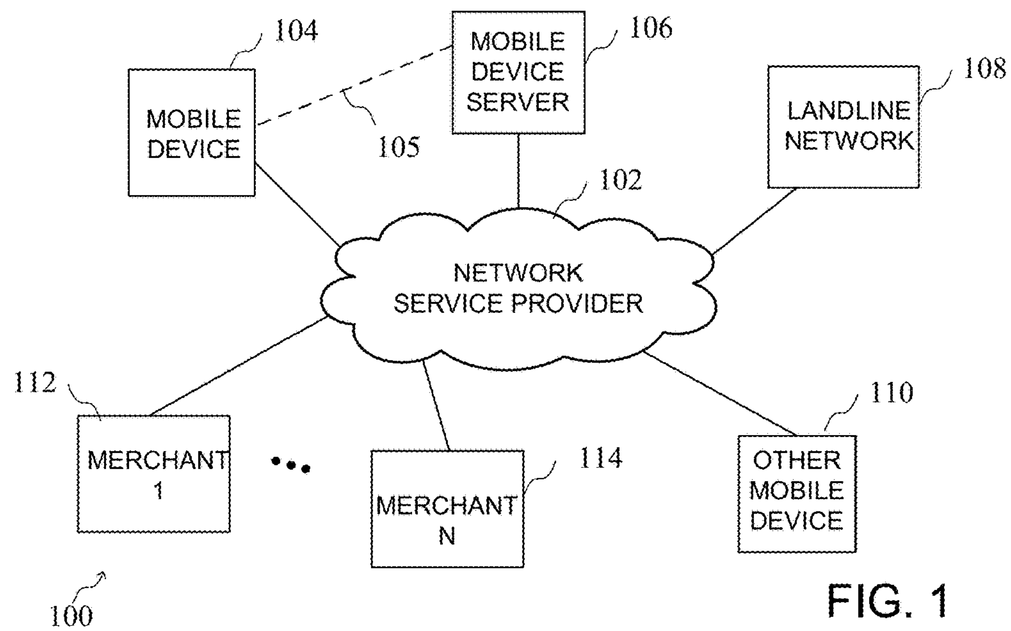
FIG. 1 is a block diagram of a system for implementing a user-centric, context aware user interface.

Turning first to FIG. 1, a system 100 provides various elements associated with a network service provider 102, which may be a wireless communication network for example. The system 100 comprises a mobile device 104 that may be coupled directly by way of a communication link 105 to a mobile device server 106, or by way of the network service provider 102. As will be described in more detail below, information related to a user-centric, context aware user interface for the mobile device may be stored on the mobile device server 106 to prevent compromising user data. The mobile device server 106 may be associated with a manufacturer of the mobile device 104, and therefore be considered a trusted entity associated with the mobile device. Other elements of the system may include a landline network 108, another mobile device 110, and various merchant websites 112-114. While other elements could be implemented in the system 100, the elements are shown by way of example to provide context for the use of the user-centric user interface of the mobile device 104. For example, a computer may be implemented to provide updated user preferences associated with the user interface by way of the network service provider 102 and using the mobile device server 106. While FIG. 1 is just one example of a system for implementing a user-centric, context aware user-interface, different configurations of elements could be implemented to enable a user-centric, context aware user-interface as described.

Figure 2:
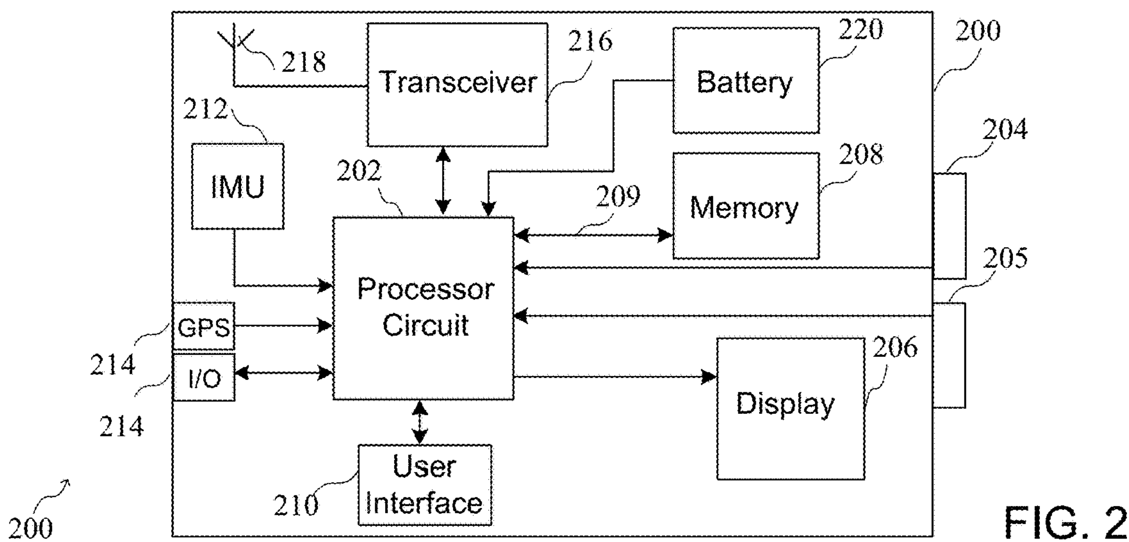
FIG. 2 is a block diagram of mobile device 104 of the system of FIG. 1.

Turning now to FIG. 2, the mobile device 104 comprises a processor circuit 202 coupled to a plurality of cameras 204 and 205. The device 104 could be any type of device adapted to transmit and receive information, such as a smart phone, tablet or other electronic device providing information. The processor circuit could be coupled to a display 206 for displaying information to a user. The processor circuit 202 may also be coupled to a memory 208 that enables storing information related to a user-centric, context aware user interface. The memory 208 could be implemented as a part of the processor circuit 202, or could be implemented in addition to any cache memory of the processor, as is well known. By providing a local memory, user preferences and other information which a user may desire to keep private is not compromised. The processor circuit 202 may also be coupled to other elements that receive inputs or provide information. For example, an inertial measurement unit (IMU) 212 can provide various information related to the motion or orientation of the device, while GPS 213 provides location information associated with the device. The processor circuit 202 may receive input by way of an input/output (I/O) port 214 or a transceiver 216 coupled to an antenna 218.

Figure 3:
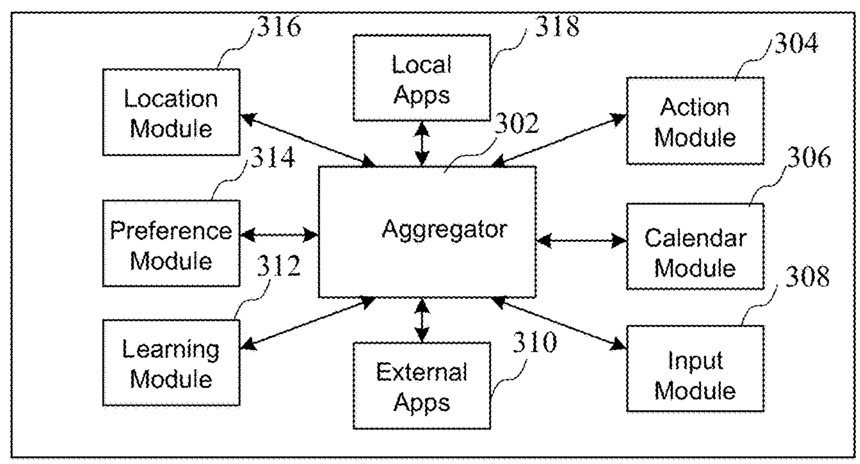
FIG. 3 is block diagram showing software modules enabling the implementation of a user-centric, context aware user interface.

Turning now to FIG. 3, a block diagram shows software modules enabling the implementation of a user-centric, context aware user interface. More particularly, an aggregator 302 provides a software function of integrating results of various software modules. The aggregator 302 may be coupled to an action module 304, which may detect movements or actions by a user of the mobile device 104. For example, action can be detected by the IMU 212 or the GPS 213. A calendar module 306, which may be associated with a calendar function of the mobile device 104, may be implemented to provide current date and time information, as well as planned events or Holiday and anniversary dates which may be of interest to the user. An input module 308 enables a user to input data associated with the user-centric user interface. The input module may receive data from any input device, such as a keypad, speaker, touchscreen display, sensor, or any other device associated with or connected to the mobile device 104 to receive data. The information provided to the mobile device may be any information which is useful or necessary in implementing the user-centric, context aware user interface. Specific examples of information that may be input to the mobile device 104 will be provided in more detail below. External applications 310 are also coupled to the aggregator 302. Examples of apps could include navigation apps, search engines, web-based applications accessible by the search engines, functional apps of the mobile device such as a call function for making a telephone call, or various other applications stored on the mobile device 104 or accessible by the mobile device 104. The various software modules may be implemented using the processor circuit 102, as will be described in more detail below.

A learning module 312 that enables modifications or updates to features of the user-centric, context aware user-interface is also shown. For example, the learning module can detect changes in user preferences based on user actions, as will be described in more detail below. A preference module 314 also enables a user to enter preferences, by way of the device 104 or remotely from another device. A location module 316 enables tracking location, and can update information to enable providing more relevant information to the user. While specific modules are shown, it should be understood that additional modules could be implemented, or the functions of various modules can be combined into a single module.

Figure 4:
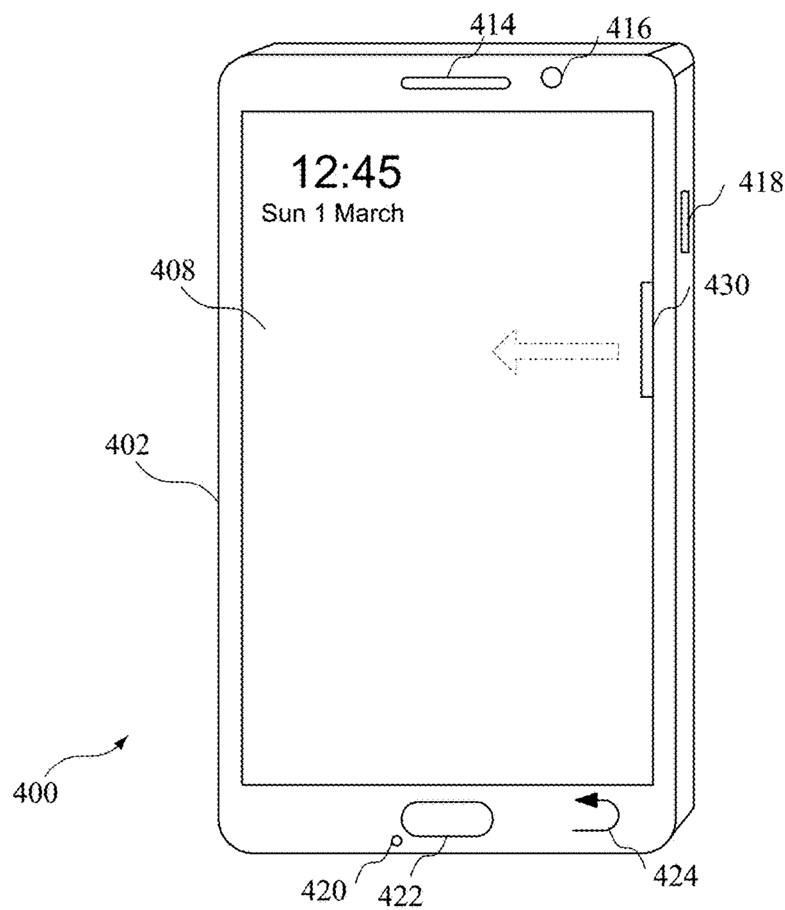
FIG. 4 is an example of a mobile device implementing a user-centric, context aware user interface.

Turning now to FIG. 4, an example of a mobile device 400 implementing a user-centric, context aware user interface. The mobile device 400 comprises a housing 402 having a display 408 visible on a front surface of the mobile device. The mobile device also comprises a microphone 412 near the bottom to enable speech input, and a speaker 414 near the top. The mobile device may also comprise a camera 416 and various control buttons 418. A home button 422 and a return button 424 enable operation of the display user interface of the mobile device. Finally, a tab 430 enables a user to easily access the user-centric, context aware user-interface. For example, the user could slide the tab to the left as shown by the dashed arrow to access the main interface of the user-centric, context aware user-interface.

Figure 5:
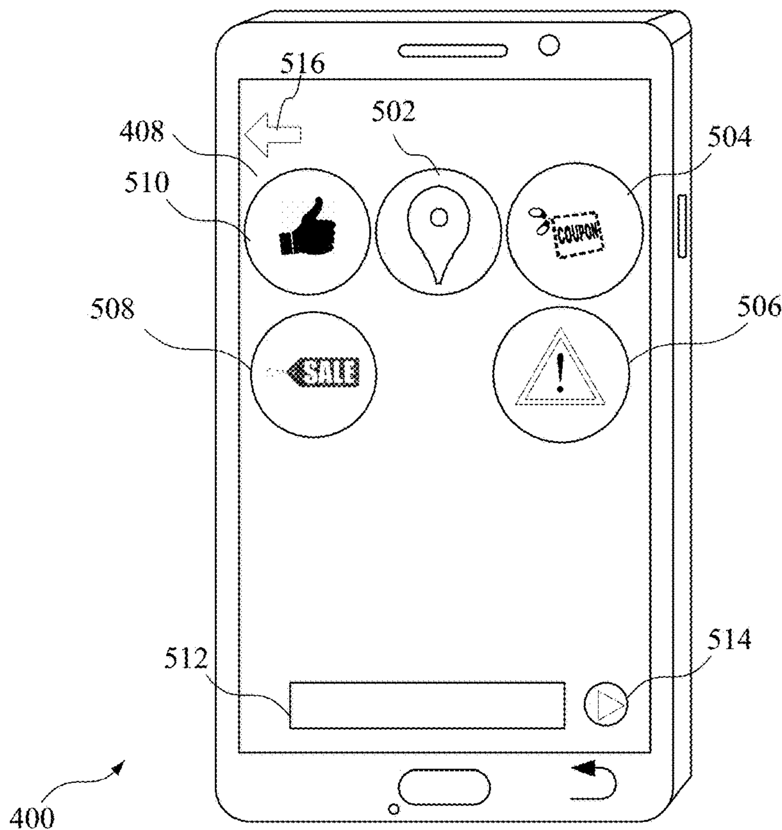
FIG. 5 is a diagram showing a main interface for a user-centric, context aware user interface.

More particularly, the main interface comprises a plurality of "task buttons" that are known to a user and when selected, provide additional information which may be of particular interest to user. According to the particular example of FIG. 5, a location button 502, a coupon button 504, and information button 506, a sale button 508, and a review button 510 are provided. However, as will be described in more detail below, the particular task buttons may change for various reasons, including preferences of the user, actions of the user, the location of the user, the time, the date or calendar events associated with the user, or other information that may be relevant in providing the most useful and relevant information to user. The main interface also comprises a search bar 512 and a selection option 514 to enable the search based upon text entered in the search bar, where a return option 516 may be provided on the display. However, the user interface would be response to any type of input, such as a voice input, or other modes of input such as a camera for QR code or bar code scanning. The various task buttons could be implemented as icons as shown in FIG. 5, or with some other designation, such as text.

While specific task buttons are shown by way of example, it could be that a greater or lesser number of task buttons could be shown. As will be described in more detail below, the task buttons that are shown could be provided in response to a query in the search bar, where the results of the query may be affected by context. In some implementations, the task buttons may be just based upon context. As will be further described, any task buttons or other information provided based only upon context may be based upon clear context that a user desires information. Therefore, there may be no task buttons displayed in the event that there is no clear context. Specific examples of the results of a query will be provided, followed by examples of information that may be provided in response to the selection of a task button. It should be noted that information may be provided in response to the selection of a task button provided in response to a query or just based upon context.

Figure 6:
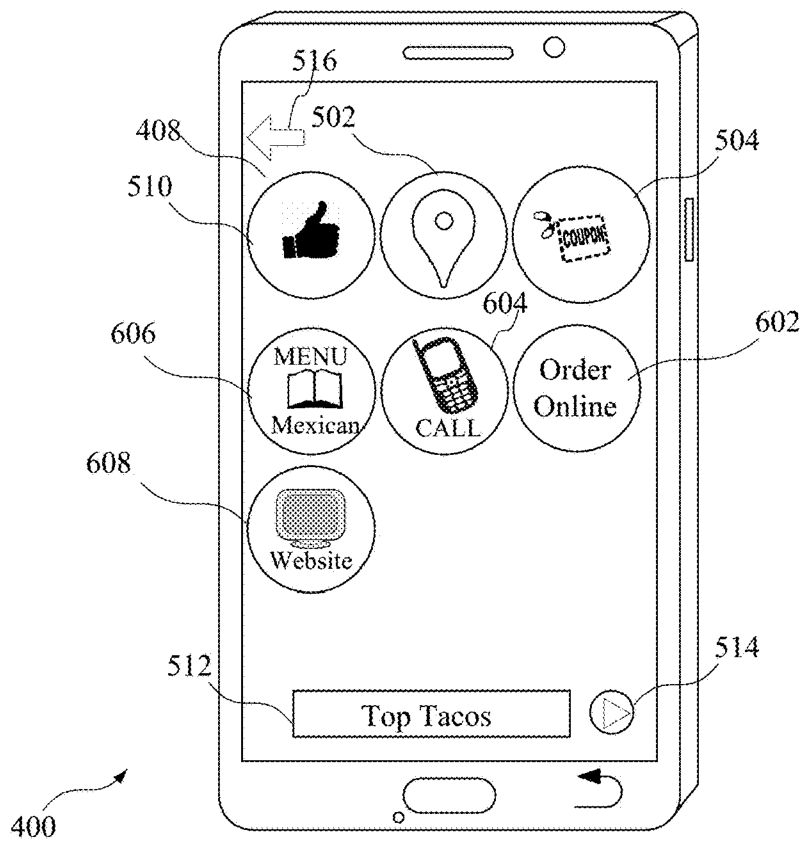
FIG. 6 is a diagram showing a main interface of the user-centric, context aware user interface based upon a specific search request.

Turning now to FIG. 6, a diagram shows a main interface of the user-centric, context aware user interface based upon a specific search request, which is a search for a hypothetical taco restaurant "Top Tacos." As shown in FIG. 6, in addition to the location task button 502, coupon task button 504, and review task button 510, additional task buttons are provided that provide information relevant to the search. More particularly, an "Order Online" task button 602 may be provided to enable a user to directly access an ordering page to order food from the restaurant or chain of restaurants provided in response to the query. The "Order Online" task button 602 may be a direct link to an online ordering feature associated with the webpage for the restaurant. Similarly, a "Call" task button would enable a user to call the restaurant closest to the user, or may give a user an option to select a particular restaurant. A "Menu" task button 606 may be provided, where the menu button may indicate that it is a Mexican restaurant and provide a direct link to the menu associated with the menu of the restaurant or the chain. After selecting the "Order Online" task button 602, the "Call" task button 604 or the "Menu" task button 606, a user can return to the task buttons of FIG. 6 by selecting the return icon 516 on the display or the return button 424 on the mobile device. For example, after the user checks the menu, the user may then select the "Order Online" task button 602 or the "Call" task button 604 to order food selected on the menu after returning to the main menu. Whenever context is not present for a particular task, the task button is either shown in grey or not presented to the user. The interface aims to provide as much information as possible to the user at one glance. The interface also includes the return button 516 to go back to the previous context or state. This button might be useful in a scenario where the user changes their mind and needs to undo the context/state adaptation of the interface It should be noted that additional task buttons or fewer task buttons may be provided based upon context or user preferences. As will be described in more detail below, the user preferences may be based upon learned user preferences or specific user preferences provided by a user when setting up or updating the user-centric, context aware user interface. For example, it may be learned that the user always orders by calling from a mobile device, and never uses the "Order Online" task button 602. While the user interface may initially present the "Order Online" task button 602 when the user starts using the user-centric, context aware user interface, the user interface may learn over time that the user does not use the "Order Online" task button 602 and no longer present it in response to queries or whenever presenting the user interface. Accordingly, the task buttons presented for the same search may vary over time based upon learned or provided user preferences. Alternatively, a user my set a preference for calling to order food rather than ordering online from a mobile device. The task buttons presented for a specific search for a restaurant may also vary over time based upon context. For example, the user interface may not present the "Call" task button 604 if the user interface knows that the user is in conference room during a meeting, knowing that the user may order instead using the "Order Online" task button 602.

Figure 7:
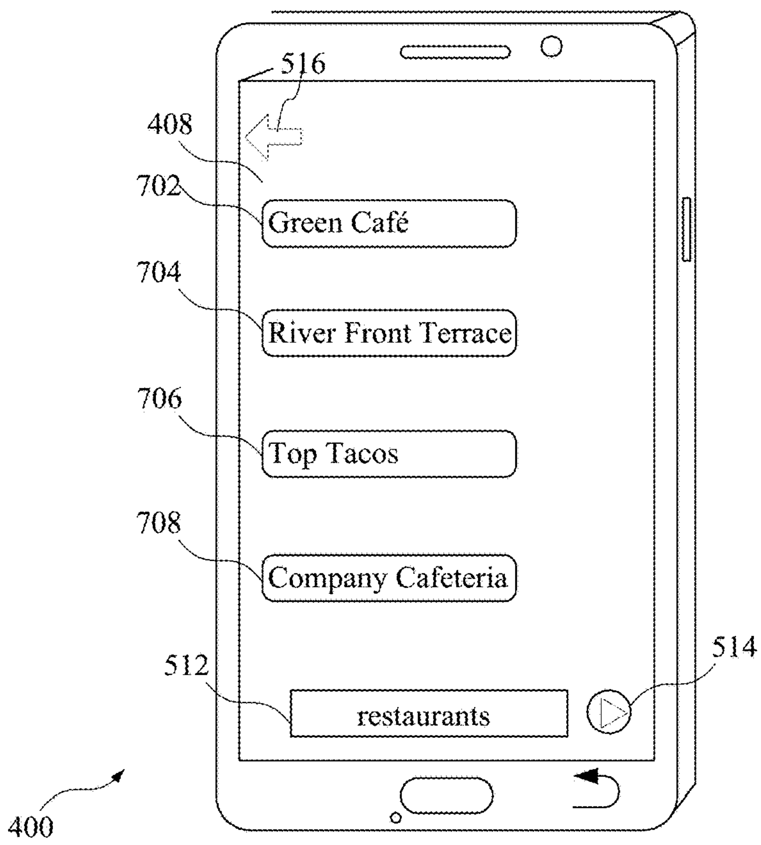
FIG. 7 is a diagram showing a main interface of the user-centric, context aware user interface based upon a general search request.

Turning now to FIG. 7, a diagram shows an updated main interface of the user-centric, context aware user interface based upon a general search request, which is a search for restaurants by way of example. Four results for hypothetical restaurants are provided, including an option 702 for the Green Café, an option 704 for the River Front Terrace, an option 706 for Top Tacos, and an option for the Company Cafeteria. Each of the results may have been provided based upon context and/or user preferences, and may be provided in order of likelihood that the user will select an option. For example, the user may be a vegetarian, and often eats at vegetarian restaurants such as the Green Café. The user interface may also present the Riverfront Terrace based upon context and user preferences. For example, the user interface may have learned over time that the user often eats at restaurants having outdoor dining, and particularly restaurants along a river. Knowing that the Riverfront Terrance is within a distance that the user often drives to go to lunch during working hours, the user interface provides the Riverfront Terrace as an option. The user interface may also know that Top Tacos is a favorite of the user, and the user often goes there on Tuesday for "Taco Tuesday" specials. Finally, the user interface may provide the company cafeteria as an option. The user interface may know that the user has a particular meeting that afternoon, and often buys a carry out lunch from the cafeteria on those days. When the user selects the company cafeteria, specials as well as the menu for that day may be provided to make it easier for the user to order quickly from the cafeteria.

The amount of information provided in response to the selection of one of the options shown on FIG. 7 could vary, and could also be based upon context and user preferences. For example, if the user were to select the Green Café option, the user may be taken directly to a navigation application. That is, the user interface may know that the user always goes to Green Café when that option is selected. If the user wants more information, the return option could be selected, and additional information could be provided when the user selects the Green Café option again. In the case of Riverfront Terrace, the user interface may know that he user has never been there, and therefore provides more information. For example, the user interface could provide information as shown in FIG. 6, enabling the user to decide the specific information that is needed. Alternatively, the user interface could provide the same information for each of the options, where the information would be based upon user preferences for information. For example, the user interface would provide a consistent presentation in response to the selection of a restaurant, where the information may include, an address, hours of operation, a price range, and a phone number.

Figure 8:
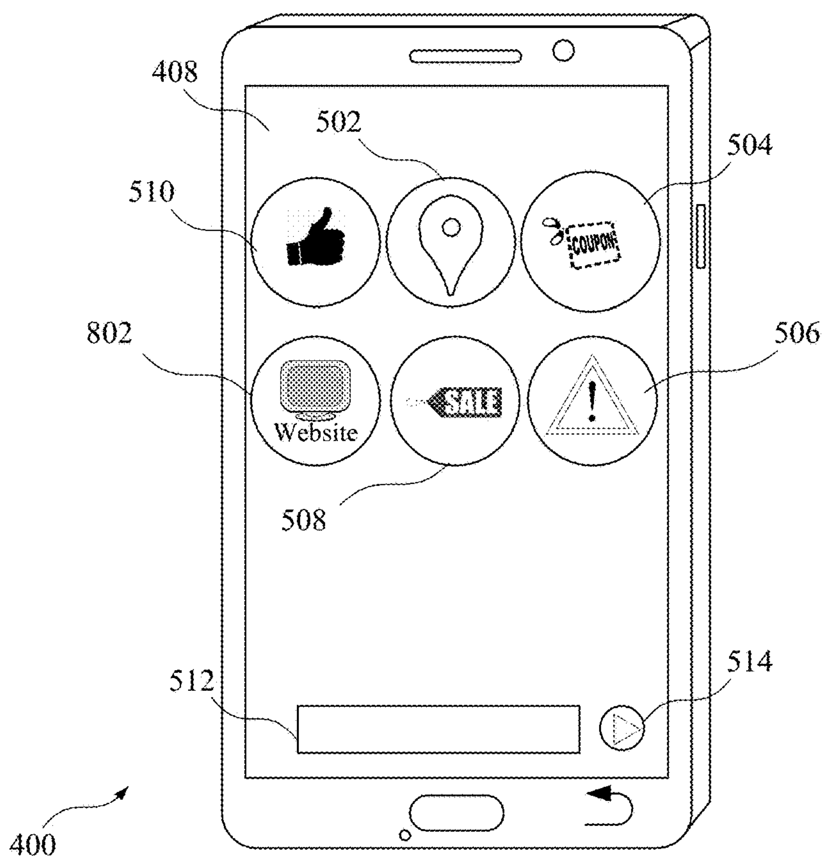
FIG. 8 is a diagram showing a main interface for a user-centric, context aware user interface based upon context.

While the implementations of FIGS. 6 and 7 relate to specific searches, it should be understood that the user interface may be extended to providing information related to context. In some implementations, information would be provided bases upon context only (i.e. when no query is entered) is a situation where there is strong context and the user would have significant interest in receiving the information. In other implementations, information may be provided even if there is not necessarily strong context, as will be described in more detail below. A diagram in FIG. 8 shows a main interface for a user-centric, context aware user interface based upon context. While the user interface may provide task buttons in response to queries, such as specific query for "Top Tacos" or a more general query for "restaurants" as described above in reference to FIGS. 6 and 7, the user interface may provide task buttons based upon context alone. That is, some users may prefer to have the option of receiving information even if they are not actively searching for something in particular. That is, some users may prefer to have the option of accessing information that may be of interest based upon context. However, it should be understood that the information would not be pushed by an application associated with the mobile device, but rather user-centric information which the user interface learns would be desirable for the user. For example, a flight that the user was supposed to have taken may be delayed, providing down time for the user. The user interface may provide information related to stores that the user often frequents at airports, or information that the user often accesses at airports, such as the weather at home. The information that is provided may be based upon strong context, and may be information that is normally accessed based upon a similar context. Alternatively, it may be that the user generally accesses a lot of information, and therefore provides a wide variety of information that may not be closely related to context. Even when a wide variety of information is provided, that information may be paired down over time in response to learned user preferences determined in response to user actions.

The amount of information that is provided may also vary. According to some implementations, which may be based upon the learned or selected preferences of the user for example, a single level of information may be provided. That is, the information that is provided may be specific to the search or clear context associated with the user device. The information provided by the user interface would be targeted information that is most likely desired by the user. Alternatively, in response to learned or selected user preferences, the information may be provided in tiers of information. For example, a user may desire a significant amount of information or available options to access information, in which case the information may be provided in tiers. The amount of tiering may vary based upon a search. For example, when a user enters a query for a restaurant, the user may desire any needed information to be displayed on a single screen. However, a user may desire different options in response to a general search for entertainment, where additional information may be provided in lower tiers in response to the selection of a result on the first tier. The presentation of information may be changed over time in response to the selection of information by the user for example. That is, the user interface may learn that a certain type of information is generally accessed by the user, and therefore provide that information.

Figure 9:
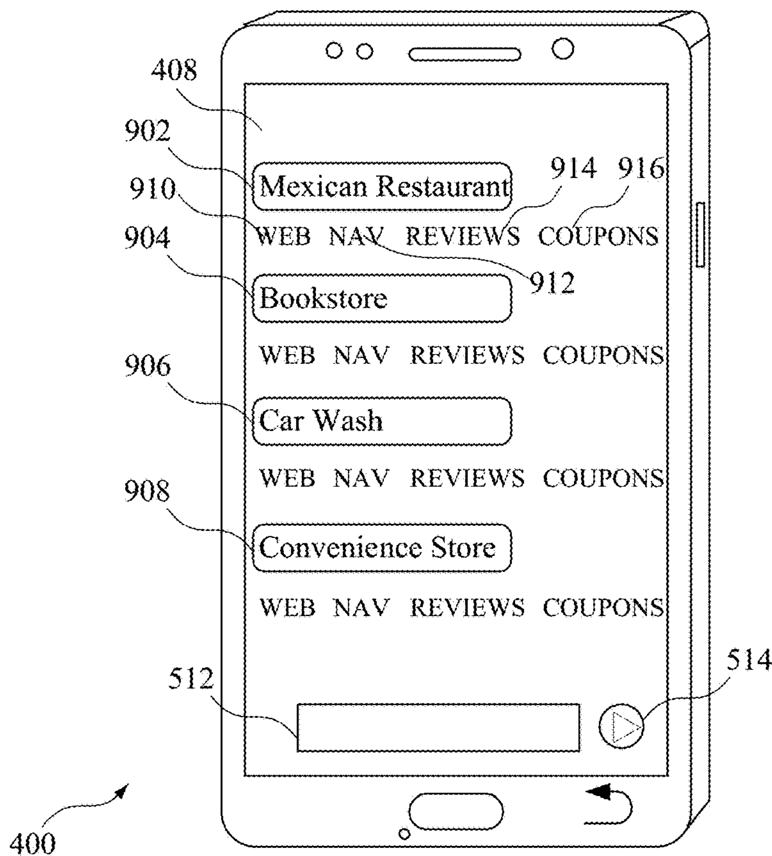
FIG. 9 is a diagram showing information provided in response to the selection of a location button.

Examples of information provided in response to the selection of task buttons will be described in FIGS. 9-18, where the specific information would depend upon the specific search, and in the case of information provided based upon context, would depend upon whether the context was strong context or very broad context, as will be described in more detail below. A diagram in FIG. 9 shows information provided in response to the selection of a location button by way of example. As shown in FIG. 9, four different information options are available in response to the selection of the information test button, including a Mexican restaurant option 902, a bookstore option 904, a car wash option 906, and a convenience store option 908, each of which may be located nearby. While the option may be selected to access any information, each option may also include quick access options to take you directly to specific information. For example, a web (WEB) option 810 would take you directly to a webpage for the Mexican restaurant 802. A navigation (NAV) option would take you directly to a navigation app for providing directions to the Mexican restaurant. A review (REVIEW) option 814 would provide reviews for the Mexican restaurant. The reviews could be provided by a third party app which is accessible by the aggregator, or could be provided by the mobile device server 106 for example. Coupons could be provided in response to a selection of the coupons (COUPONS) option 816, where they coupons may be made available by way of one or more applications available by way of the network service provider, or may be provided by the mobile device server 106 for example. While specific examples of options for accessing additional information are shown, it should be understood that other options may also be used, or that the available options may change in response to a user's actions while using the user interface. If some information is not available for a specific option, such as a coupon for the convenience store, that quick access option would not be provided. While the example of FIG. 8 shows a variety of options in a wide area, the available options would be in a smaller location, such as a mall or even is a single store.

Figure 10:
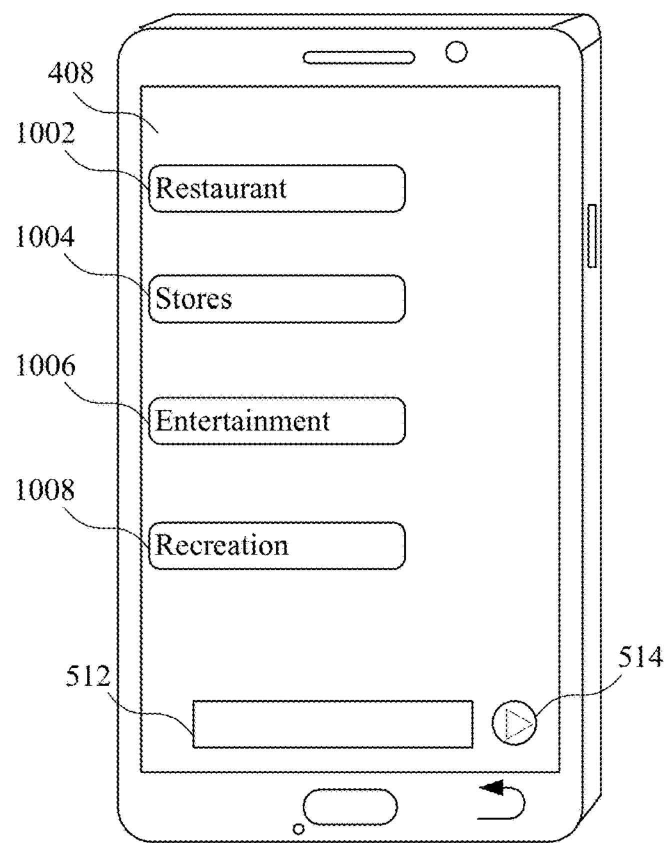
FIG. 10 is a diagram showing information provided in response to the selection of a location button arranged according to category.
Figure 11:
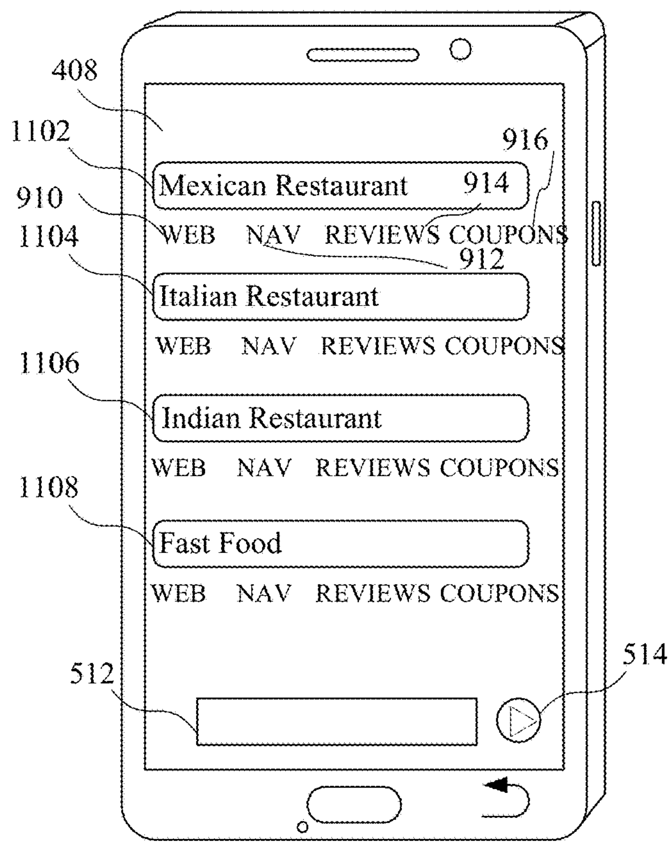
FIG. 11 is a diagram showing information provided in response to the selection of a restaurant category as shown in FIG. 10.

Turning now to FIG. 10, a diagram showing information provided in response to the selection of a location task button arranged according to category. More particularly, rather than showing a group of disparate options available in response to selecting the location button, categories of items of interest may be provided as shown in FIG. 10. For example, a restaurant category 1002, a store category 1004, and entertainment category 1006, and a recreation category 1008 may be provided. In response to the selection of the restaurant category 1002, various restaurants may be listed including a Mexican restaurant 1102, an Italian restaurant 1104, and Indian restaurant 1106, and a fast food restaurant 1108, as shown in FIG. 11. Each of the available restaurant options would also include the quick access options as described in FIG. 8.

Figure 12:
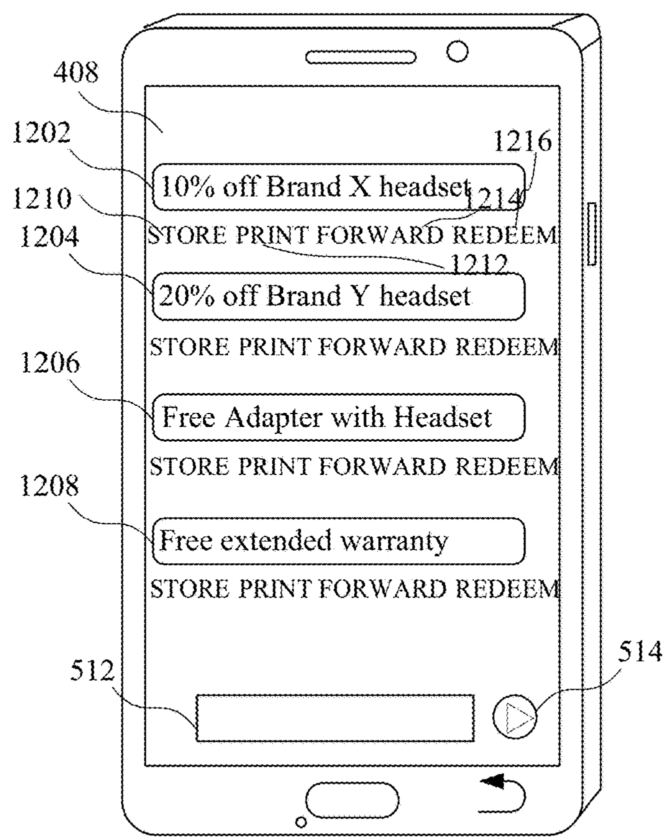
FIG. 12 is a diagram showing information provided in response to the selection of a coupon button.

Turning now to FIG. 12, a diagram shows information provided in response to the selection of a coupon task button given the context that the user is shopping for a headset. More particularly, various coupons could be presented, including 10% off Brand X headset coupon 1202, a 20% off Brand Y coupon 1204, a free adapter with headset purchase coupon 1206, and a free extended warranty coupon 1208. A different set of quick access options may be provided for the coupons. For example, store information can be accessed by a store quick access option 1210. The coupon can be printed to any available printer using a print option 1212, or forwarded to a different location, such as an email address accessed using a contact list on the mobile device by selecting the forward quick access option 1214. The coupon can be redeemed by selecting the routine quick access option 1216, which could send a message to the vendor during a transaction associated with the coupon. As described above with respect to FIG. 8, different quick access options can be provided, or changed in response to actions by user.

Figure 13:
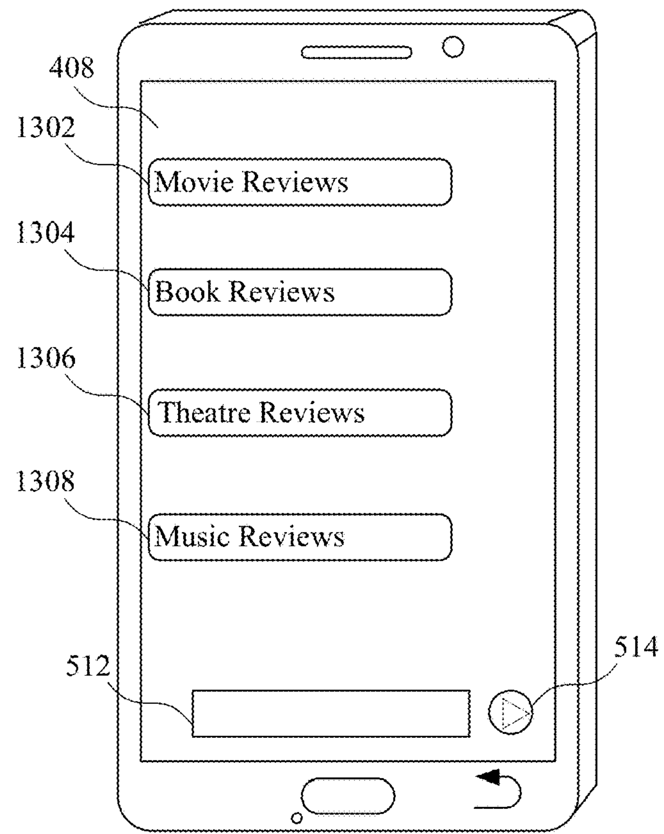
FIG. 13 is a diagram showing information provided in response to the selection of a review button.

Turning now to FIG. 13, a diagram shows information provided in response to the selection of a review task button. More particular, as shown in FIG. 13, a movie review option 1302, a book review option 1304, a theater review option 1306, and a music review option 1308 are provided. Particular reviews associated with each option are provided in response to selecting a particular option.

Figure 14:
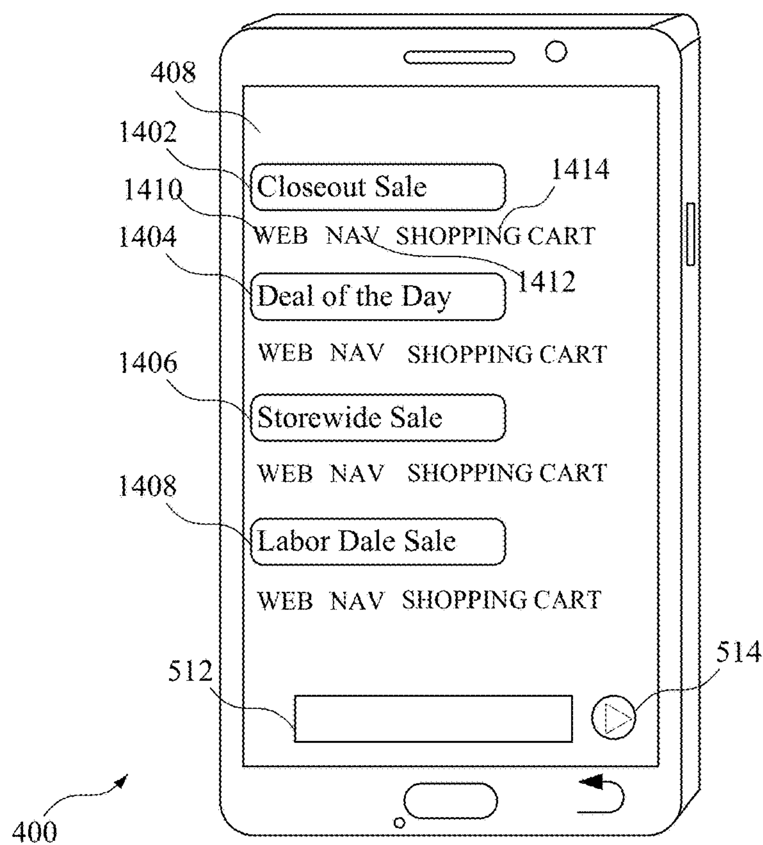
FIG. 14 is a diagram showing information provided in response to the selection of a sale button.

Turning now to FIG. 14, a diagram shows information provided in response to the selection of a sale task button. For example, a closeout sale option 1402 may be provided, enabling a user to obtain early access to the closeout sale before merchandise has already been liquidated. A deal of the day option 1404 may also be provided based upon user preferences for common purchases made by the user. A storewide sale 1406 option may be provided to enable the user to take advantage of a storewide sale for stores where the user commonly shops. Specific sales may also be provided, such a Labor Day sale option 1408. Another set of quick access options may be provided with the sales opportunities. For example, a web option 1410, a navigation option 1412, or a shopping cart option 1414 may be provided. As set forth above, different quick access options may be provided in response to actions taken by user when presented with sale options. For example, if a user has never added a product to a shopping cart, but has provided product reviews, the shopping cart option may be replaced with a review option.

Figure 15:
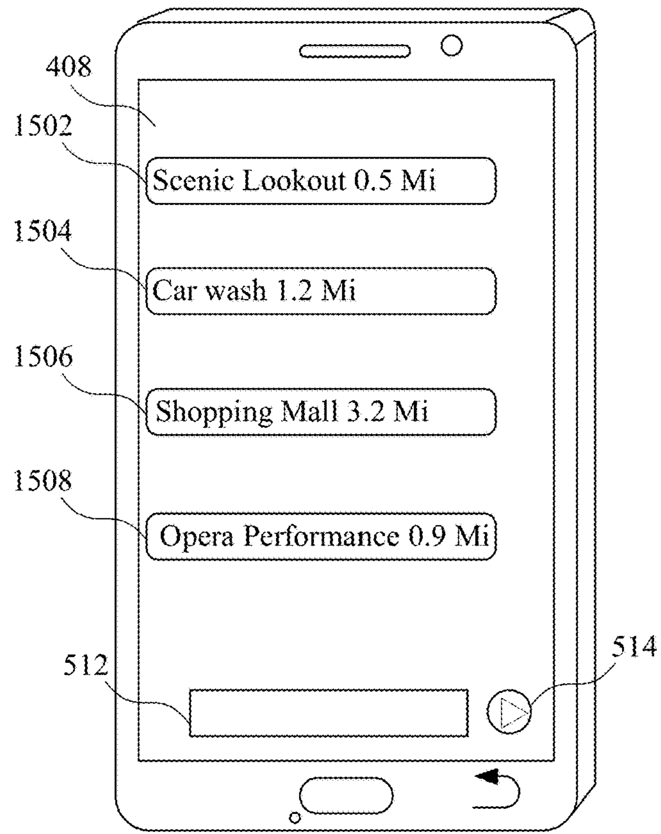
FIG. 15 is a diagram showing information provided in response to the selection of an information button.
Figure 16:
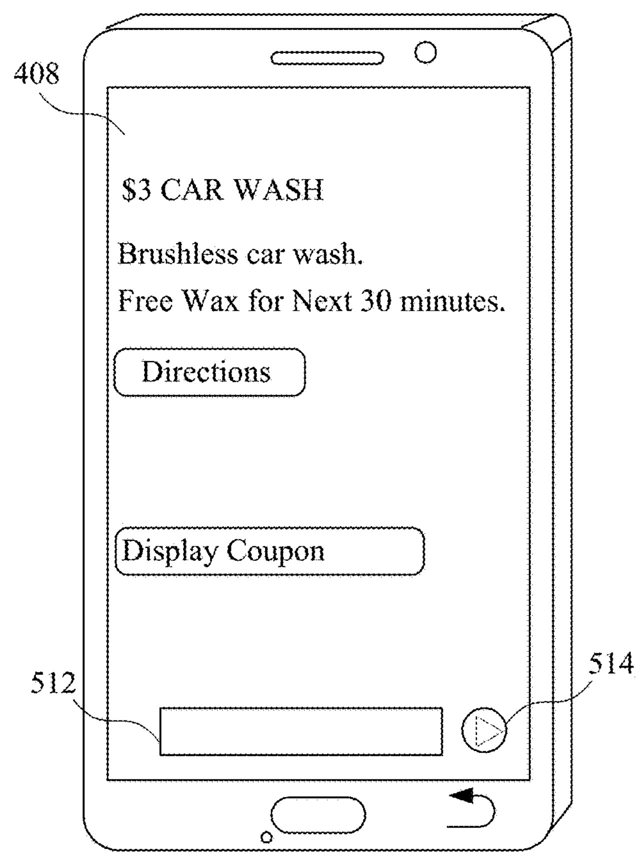
FIG. 16 is a diagram showing information provided in response to the selection of a particular information option provided in FIG. 15.

Turning now to FIG. 15, a diagram shows information provided in response to the selection of an information task button. Information may include any type of information which may be of interest to the user, and not necessarily fall into another task button. The information task button could be particularly beneficial if the user is on vacation or has moved to a new town. For example, a point of interest option 1502 may indicate that a scenic lookout is available within 0.5 miles of the current location. A carwash option 1504 may indicate that a carwash is available within 1.2 miles of the current location. Although there may not be a sale at the carwash or there may not be a coupon available, the user-centric, context aware user interface learns that the user tends to use a car wash often, and therefore sees it as beneficial to provide information related to the carwash to the user. The user may also be a frequent shopper, and therefore a shopping mall option 1506 may indicate that a shopping mall is available within 3.2 miles of the user. While there may not be any specific deal or coupon associate with any store at the shopping mall, the user may benefit from knowing that the shopping mall is nearby. Finally, an opera performance option 1508 may be provided to indicate that an opera performance is available within 0.9 miles of the current location of the user. While this information may also be available under the entertainment option as a category of the location button, it may also be beneficial to provide this information to the user as general information in response to the selection of the information button. Further, as shown in FIG. 16, a coupon may be available for the carwash, which would be presented in response to the selection of the carwash option, which may also provide directions to the carwash.

Figure 17:
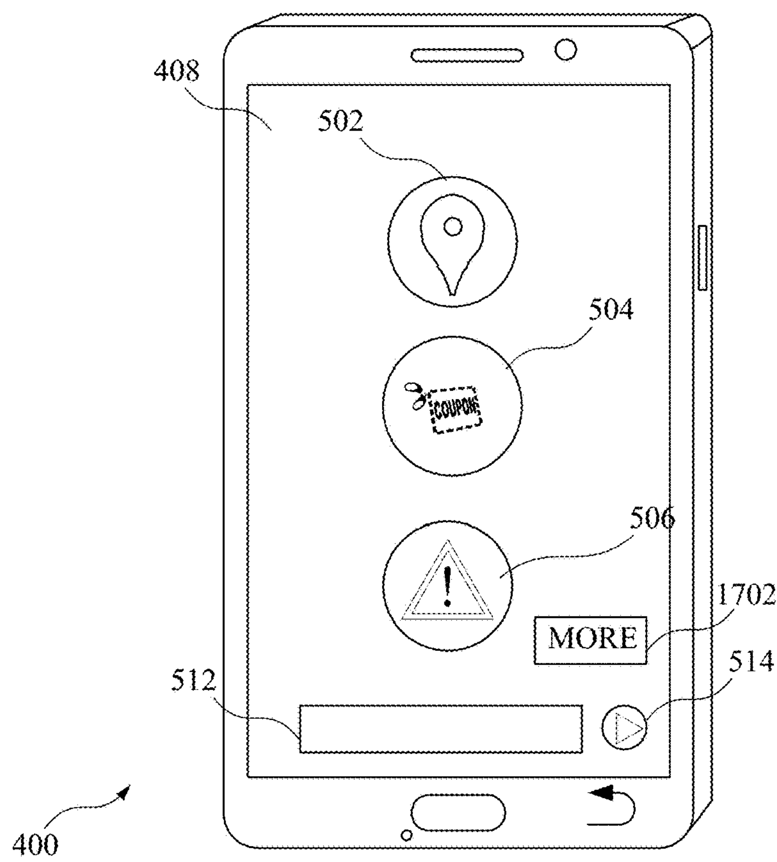
FIG. 17 is a diagram showing an updated main interface of the user-centric, context aware user interface based upon user interactions.

Turning now to FIG. 17, a diagram showing an updated main interface of the user-centric, context aware user interface based upon user interactions. According to one aspect of the user-centric, context aware user interface, various options that are presented may vary in response to actions of the user or other factors such as location. FIG. 17 shows the main interface having only three test buttons. That is, the user predominantly uses these task buttons, enabling it easier for a user to access the desired information. However, the user can access additional information which may not be shown on the device by selecting the "MORE" button 1702.

Figure 18:
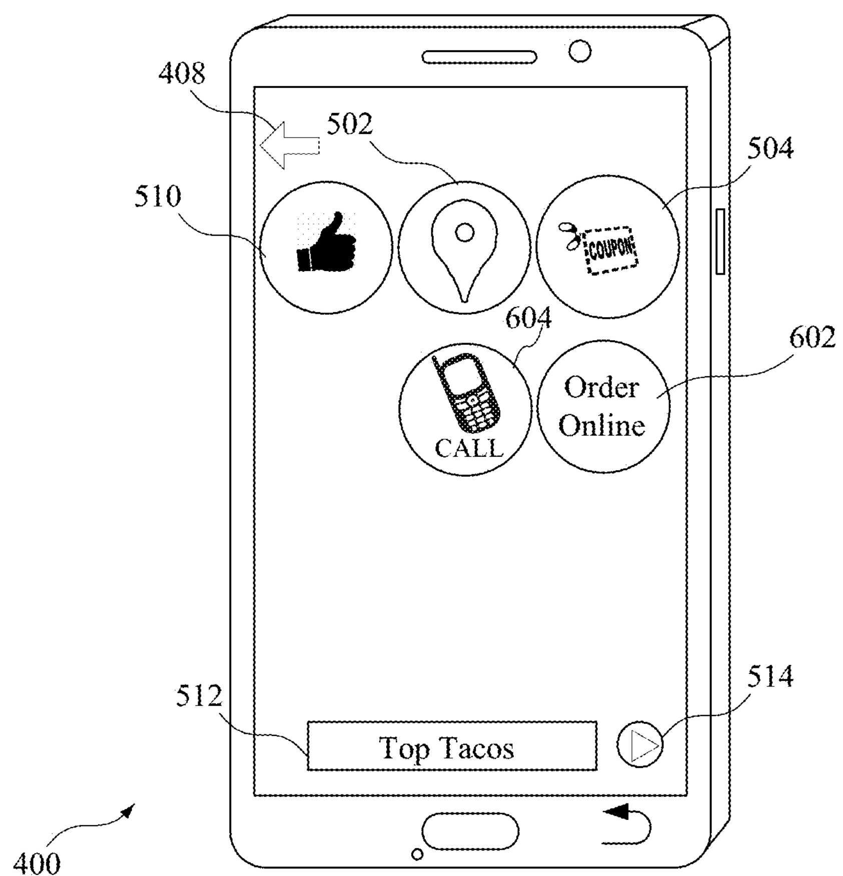
FIG. 18 is a diagram showing an updated main interface of the user-centric, context aware user interface based upon a search request.

Turning now to FIG. 18, a diagram showing an updated main interface of the user-centric, context aware user interface in response to a specific search by the user for "Top Tacos," which is a generic name for a taco chain. The screen is now populated with fewer relevant task buttons, and active task buttons are populated with relevant information. That is, the user interface may determine that the user may not access the menu or the website for Top Tacos, or for restaurants in general, and therefore may not include them in response to a query.

One beneficial aspect of the user interface is the adaptation of the user interface to user actions and queries. For example, the task buttons that are active and presented to the user change based on the query and also adapt to user actions. For example, if the current query is "buying a plane ticket" the task buttons might include "price comparison", "price tracking", "airline reviews", "availability" etc. but will not include a task button for "map" or "directions" since these are not relevant to the query.

The functionality of the task buttons may also change based on the user's actions. For example, if the current query is "Italian restaurant", the "call" context might list the numbers of all Italian restaurants in the vicinity and "maps" task button will show a map with all restaurants in the vicinity. But as soon as the user selects a particular location on the map, the functionality of the "call" task button is updated from displaying phone numbers of different restaurants to directly calling the selected restaurant. Similarly, the functionality of the "maps" task button will now change to providing directions to selected location.

The user interface will continually learn user preferences and customize the task buttons and functionalities of the task options associated with the task buttons based on learned user preferences and behavior. For example, the user interface could learn that user prefers restaurants with 4 stars or above rating on a particular restaurant rating app and doesn't like to spend more than 45 mins at lunch. Now based on context that user wants to have salad for lunch, the user interface could pick a restaurant that meets the user's criteria and adapt the task buttons based on the selected criteria.

Figure 19:
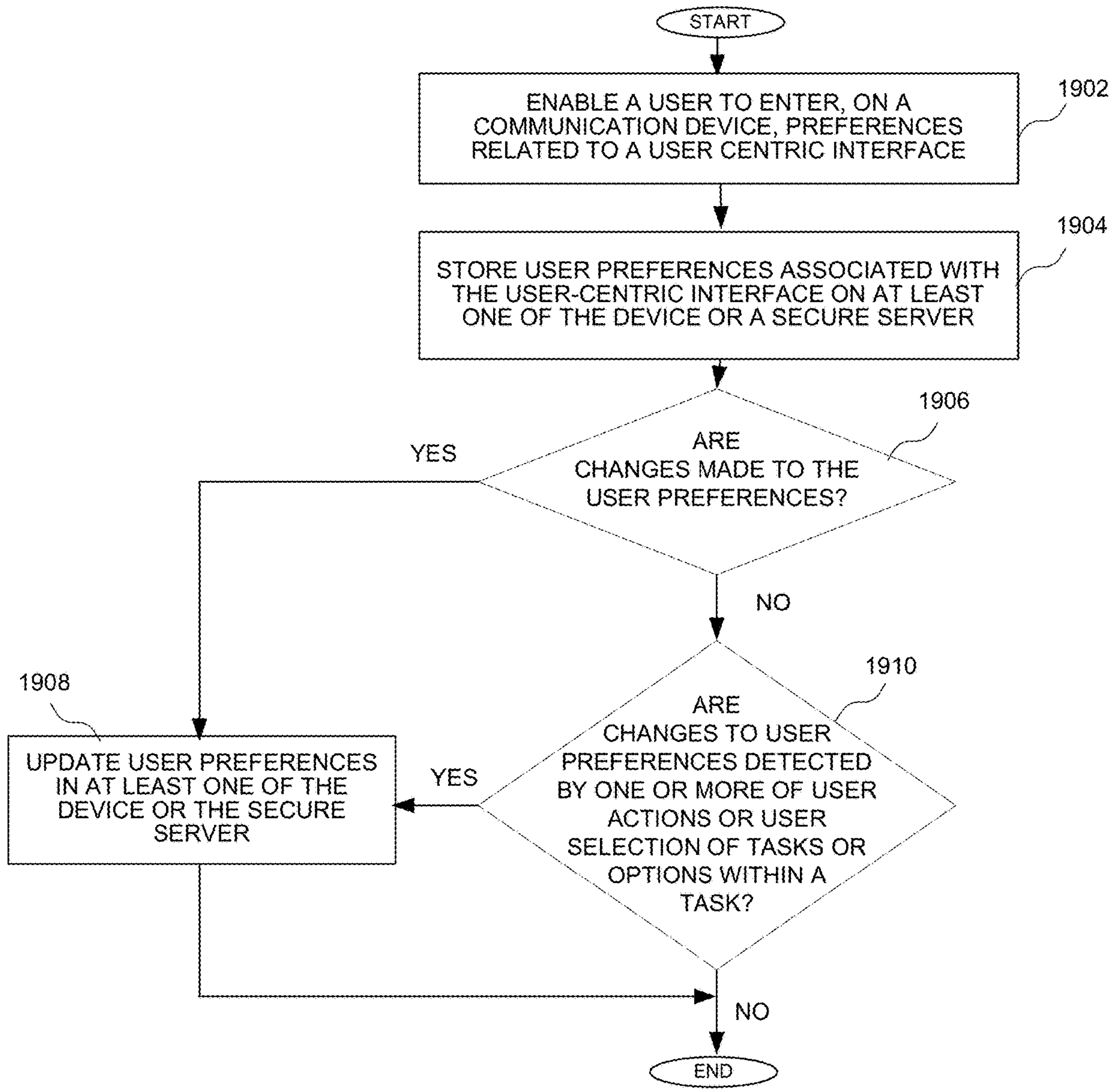
FIG. 19 is a flow chart showing a method of updating user preferences associated with a user-centric user interface based upon user actions.
Figure 20:
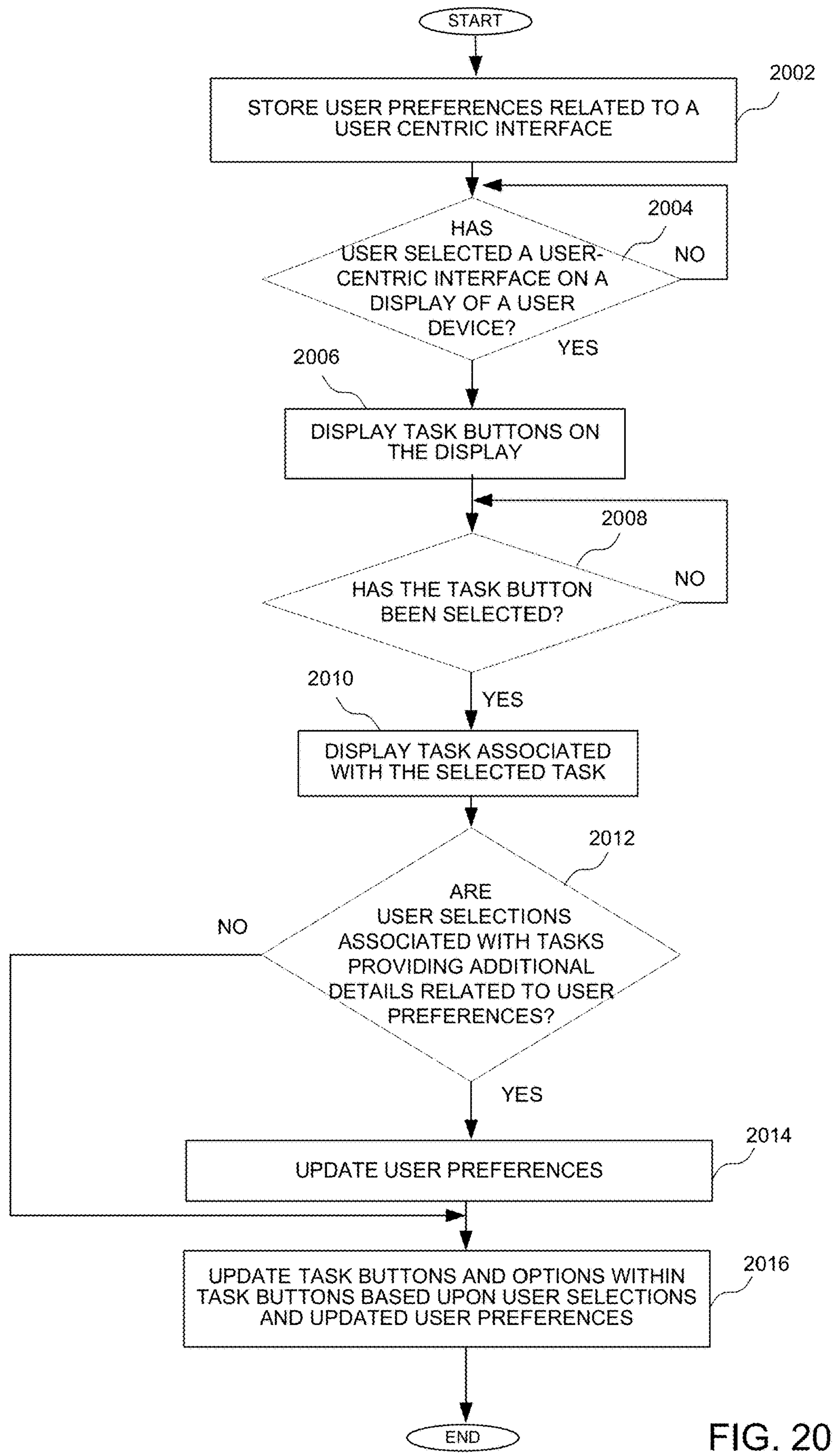
FIG. 20 is a flow chart showing a method of updating task buttons and options associated with task buttons based upon user selections.

Turning now to FIG. 19, a flow chart showing a method of updating user preferences associated with a user-centric user interface based upon user actions. A user is able to enter, on a communication device, preferences related to a user-centric interface at a block 1902. User preferences associated with the user-centric interface are stored on at least one of the device or a secure server at a block 1904. It is then determined whether changes made to the user preferences at a block 1906. User preferences are updated in at least one of the device or a secure server at a block 1908. It is then determined whether changes to user preferences are detected by one or more of user actions or a user selection of tasks or options within a tasks at a block 1910. If so, user preferences are updated in at least one of the device or a secure server at block 1908.

Turning now to 20, a flow chart showing a method of updating task buttons and options associated with task buttons based upon user selections. User preferences related to a user-centric Interface are stored at a block 2002. It is then determined whether a user has selected a user-centric Interface on a display of a user device at a block 2004. If so, task buttons are displayed on the display at a block 2006. It is then determined whether a Task button been selected at a block 2008. If a task button is selected, one or more task options associated with the selected task are then displayed at a block 2010. It is then determined whether user selections associated with tasks provide additional details related to user preferences at a block 2012. For example, selections of certain task buttons or options associated with task buttons could indicate a preference for certain actions. User preferences are updated at a block 2014. Task buttons and options within task buttons are also updated based upon user selections and updated user preferences at a block 2016.

The user interface will continually learn the context associated with the user, where context could include a wide range of information from a location of the user to action the user performed on the device. Based on the context, both the type of task buttons and the functionality of the task buttons, will change. For example, a query on particular Bluetooth headset for a mobile device inside a big box store will result is task buttons such as, "reviews" pertaining to product reviews, "deals" pertaining to coupons/deals for headset available through the big box store, "price comparison" showing prices for headset in nearby retailers, "availability," such as at a particular store, a "friends opinion," which could be a collection of social media comments from friends on headset, and "similar products" showing products which might be of interest to the user.

Another example could be that a user takes a selfie within a retail store while trying-on a beret, where the user interface will be populated with task buttons relating to posting on social media (Facebook, Twitter, Instagram, Pinterest etc.) or ability to message multiple friends. The selfie image could also be analyzed using image processing techniques and compared with store database to identify information related to products in the image. The user interface could then provide addition information about the product. The additional information could be either from the brand owner or the retailer. Examples of addition information could include materials used for the product and how they were sourced (i.e. socially responsible, eco-friendly etc.).

Figure 21:
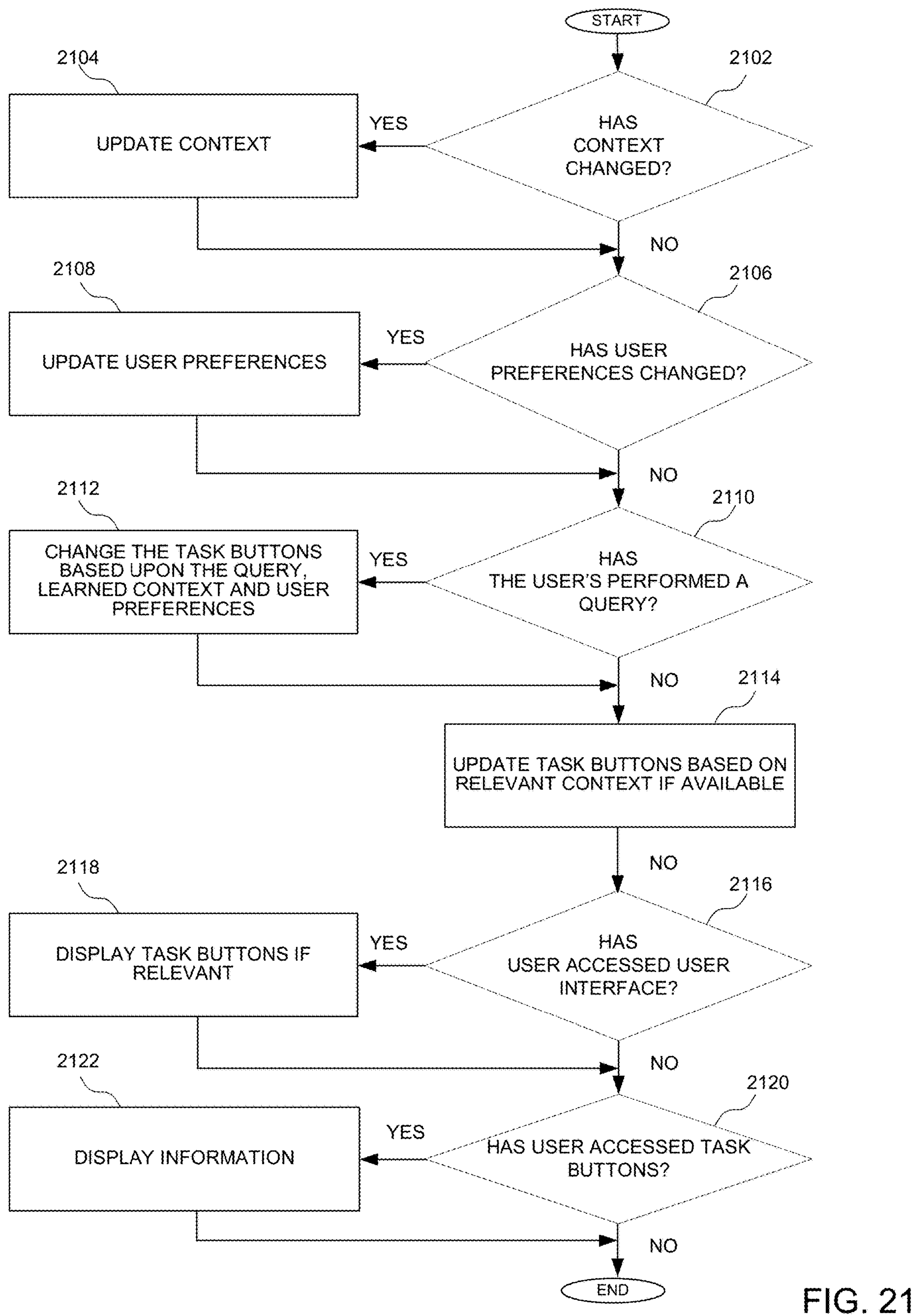
FIG. 21 is a flow chart showing a method of enabling a learning function associated with a user-centric user interface.
Figure 22:
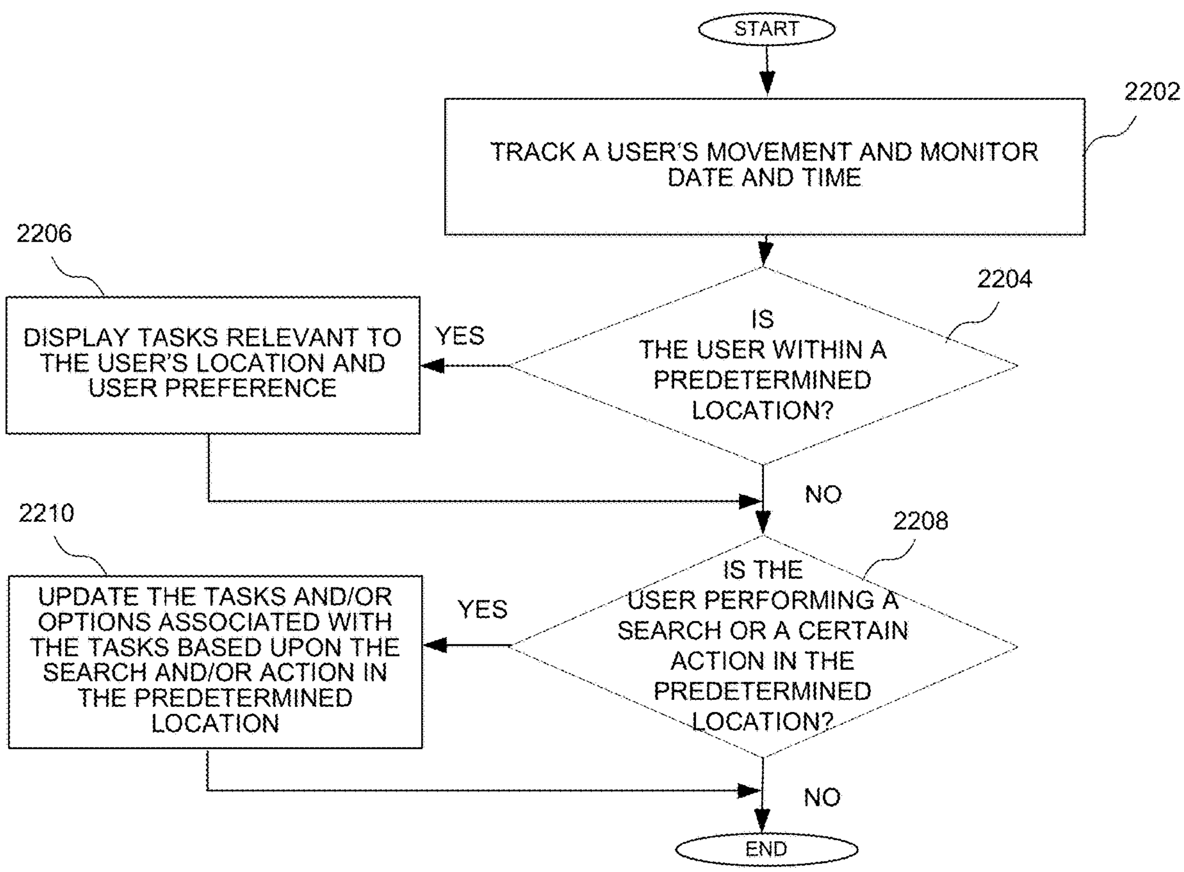
FIG. 22 is a flow chart showing a method of enabling a location-based feature of a user-centric user interface.
Figure 23:
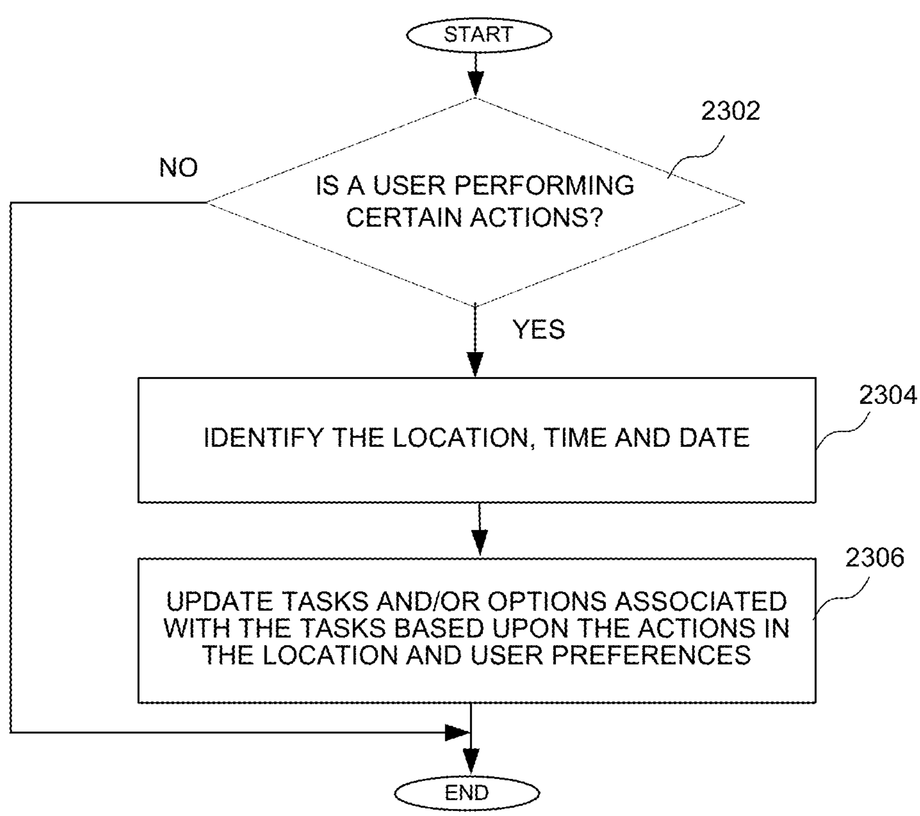
FIG. 23 is a flow chart showing a method of updating options of a user-centric user interface based upon actions of a user.

Turning now to 21, a flow chart shows a method of enabling a learning function associated with a user-centric user interface. As shown in FIG. 21, it is determined whether context has changed at a block 2102. Context may have changed based upon a variety of factors as set forth above, including but not limited to time, date, temperature, location, acceleration, motion, and ambient light for example. If so, context is updated at a block 2104. It is determined whether user preferences have changed at a block 2106. For example, changes in user preferences can be learned, such as through the movement of the user, different buying habits, the entry of different types of queries or conduct after queries, or any other tracking of user behavior leading to certain user actions. If user preferences have changed, user preferences are updated at a block 2108. It is determined whether the user has performed a query at a block 2110. If so, the task buttons are changed based upon the query, learned context or user preferences at a block 2112. Even if the user has not performed a query, task buttons may be updated based upon relevant context if available at a block 2114. For example, if a user is in a particular location or near a particular store, the user interface may provide various task buttons that may be relevant to the user. As set forth above, the task buttons may be tied to strong context, for example. It is then determined whether the user has accessed the user interface at a block 2116. If so, task buttons that are relevant are displayed at a block 2118, as described above in reference to FIGS. 5 and 6. It is determined whether the user has accessed a task button at a block 2120. If so, information associated with the task button is displayed at a block 2122.

Turning now to 22, a flow chart shows a method of enabling a location based feature of a user-centric user interface. A user's movement is tracked and the date and time are monitored at a block 2202. It is then determined whether the user is within a predetermined location at a block 2204. The location provided context information and is therefore used to provide more relevant information to the user of the user-centric user interface. Tasks relevant to the user's location and user preference are displayed at a block 2206. It is then determined whether the user is performing a search or a certain action at the predetermined location at a block 2208. The tasks and/or options associated with the tasks are updated based upon the search, time, and/or action in the predetermined location at a block 2210.

Turning now to 23, a flow chart shows a method of updating options of a user-centric user interface based upon actions of a user. It is determined whether a user is performing certain actions at a block 2302. If so, the location, time and date are identified at a block 2304. Tasks and/or options associated with the tasks are updated based upon the actions in the location and user preferences at a block 2306.

It can therefore be appreciated that new devices for and methods of implementing a user-centric user interface have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A method of implementing a user interface on a mobile device, the method comprising:

learning, using a processor, user preferences and context information, wherein the context information includes a location of the mobile device;

determining and updating, using the processor, the context information and the user preferences on at least one of the mobile device or a secure server;

enabling access to a user interface comprising a plurality of task buttons on a display, wherein each task button of the plurality of task buttons is selectable and provides information associated with the task button;

displaying task buttons of the plurality of task buttons based upon a location of the device;

receiving a query for a search;

changing the displayed task buttons based upon the query and the location of the mobile device;

displaying task options associated with a task button in response to the selection of the task button, wherein the displayed task options comprise information aggregated from a plurality of applications and are based upon a location of the device and learned user preferences determined in response to user actions associated with a selection of the task button.

2. The method of claim 1 wherein learning user preferences comprises determining whether a user has previously selected a task button.

3. The method of claim 1 further comprising displaying information in response to the selection of a task button.

4. The method of claim 1 further comprising aggregating information from a plurality of applications accessed by the mobile device.

5. The method of claim 1 further comprising storing user preferences associated with the user interface on at least one of the mobile device or a secure server.

6. A method of implementing a user interface on a mobile device, the method comprising:

storing user preferences related to the user interface;

determining a location of the mobile device;

displaying task buttons comprising icons on a display of the mobile device in response to a user accessing the user interface, wherein the task buttons selected to be displayed are based upon the location of the mobile device;

changing the displayed task buttons in response to a change in the location of the mobile device;

receiving a query for a search;

changing the displayed task buttons in response to the query;

displaying task options in response to selecting a particular one of the task buttons, wherein the task options comprise information aggregated from a plurality of applications and are based upon the location of the mobile device and learned user preferences determined in response to user actions associated with a selection of the particular one of the task buttons;

updating, using a processor, context and the learned user preferences for the user interface based upon the selection of the particular one of the task buttons; and updating task options provided in response to the selection of the particular one of the task buttons based upon the location and the learned user preferences.

7. The method of claim 6 wherein updating context and the learned user preferences for the user interface comprises updating task buttons displayed on the user interface.

8. The method of claim 6 wherein storing user preferences related to a user interface comprises storing the user preferences on the device or on a secure server.

9. The method of claim 6 further comprising aggregating information from a plurality of applications accessed by the mobile device, wherein the information is aggregated in response to a user search.

10. A method of implementing a user interface on a mobile device, the method comprising:

providing a user interface having a plurality of task buttons;

changing the task buttons provided on a display of the mobile device based upon changes in a location of the mobile device;

receiving a query for a search;

changing the task buttons of the user interface displayed on the display based upon the query;

monitoring, using a processor, a selection of a particular one of the task buttons of the user interface;

displaying information in response to the selection of the particular one of the task buttons, wherein the information comprises task options having information aggregated from a plurality of applications and associated with the query; and updating the task options based upon the learned user preferences determined in response to user actions associated with the selection of the particular one of the task buttons.

11. The method of claim 10 further comprising storing the user preferences on the mobile device or on a secure server.

12. The method of claim 10 wherein displaying task buttons comprises displaying task buttons based upon a context for the mobile device.

13. A user interface displayed on a display device that enables a user to perform a search on a mobile device, the user interface comprising:

the display device configured to display:

a search input element adapted to receive a query for a search; and a plurality of task buttons, wherein task buttons of the plurality of task buttons which are displayed may be changed in response to the query;

wherein the task buttons which are displayed are adapted based on the query for the search and learned user preferences determined in response to user actions associated with a selection of a task button; and wherein, for each task button of the plurality of task buttons, task options associated with the task button comprise information aggregated from a plurality of applications and are updated based upon the learned user preferences determined in response to user actions associated with a selection of the task button.

14. The user interface of claim 13 further comprising aggregating information from a plurality of applications accessed by the mobile device.

15. The user interface of claim 13, wherein the task buttons which are displayed and the functionality of the displayed task buttons is adapted based on a context of the mobile device.

16. The user interface of claim 13 wherein the task buttons which are displayed and the functionality of the displayed task buttons are adapted based on the learned user preferences.

17. The user interface of claim 13 wherein the search input element comprises a text box for submitting the query.

18. The user interface of claim 13 wherein the search input element comprises one of a voice input or a camera.

19. The user interface of claim 13 wherein at least one or more of the task buttons enables receiving information related to a retailer, business, brand, or product.

20. The user interface of claim 13 where at least one of the task buttons enables a request for in-store help from an employee.

21. The user interface of claim 13 where at least one of the task buttons enables communication with a store employee.

22. The user interface of claim 13 wherein information about a task button is displayed within the task button.

23. A non-transitory computer-readable medium that includes a program that when executed by a computer performs a method comprising:

learning user preferences and context information, wherein the context information includes a location of a mobile device;

storing user preferences associated with a user interface on at least one of the mobile device or a secure server;

determining and updating the context information and user preferences on at least one of the mobile device or the secure server;

enabling access to the user interface comprising a plurality of task buttons on a display, wherein each task button of the plurality of task buttons is selectable and provides information associated with the task button;

displaying task buttons of the plurality of task buttons based upon a location of the device;

receiving a query for a search;

changing the displayed task buttons based upon the query and the location of the mobile device;

displaying task options associated with a task button in response to the selection of a task button, wherein the displayed task options are based upon a location of the device and learned user preferences determined in response to user actions associated with a selection of the task button; and updating task options comprising information aggregated from a plurality of applications and based upon the learned user preferences determined in response to user actions associated with a selection of the task button.

24. The computer-readable storage medium of claim 23 wherein the method further comprises learning user preferences for determining whether a user has previously selected a task button.

25. The computer-readable storage medium of claim 23 wherein the method further comprises displaying information in response to the selection of the task button.

26. The computer-readable storage medium of claim 23 wherein the method further comprises displaying different task options associated with a task button in response to the selection of the task button.

27. The computer-readable storage medium of claim 23 wherein the method further comprises aggregating information from a plurality of applications accessed by the mobile device.

* * * * *